United States Patent [19]

Morita

[11] Patent Number: 5,663,641

[45] Date of Patent: Sep. 2, 1997

[54] ROTATIONAL SPEED DETECTION UNIT

[75] Inventor: Kouichi Morita, Fujisawa, Japan

[73] Assignee: NSK, Ltd., Tokyo, Japan

[21] Appl. No.: 557,777

[22] Filed: Nov. 13, 1995

[30] Foreign Application Priority Data

Nov. 11, 1994 [JP] Japan .................................. 6-277990

[51] Int. Cl.$^6$ .............................. G01B 7/14; G01P 3/488
[52] U.S. Cl. ................ 324/174; 324/207.13; 324/207.25
[58] Field of Search ........................... 73/514.39, 514.16; 324/174, 207.12, 207.13, 207.25, 207.22

[56] References Cited

U.S. PATENT DOCUMENTS

| | | | |
|---|---|---|---|
| 4,369,405 | 1/1983 | Sato et al. | 324/174 |
| 4,700,133 | 10/1987 | Day | 324/174 |
| 4,746,862 | 5/1988 | Ueki | 324/174 |
| 5,003,259 | 3/1991 | Palazzetti et al. | 324/174 |
| 5,023,547 | 6/1991 | Pawlak et al. | 324/174 |
| 5,057,727 | 10/1991 | Jones | 324/174 |
| 5,239,263 | 8/1993 | Iwata et al. | 324/207.25 |
| 5,289,120 | 2/1994 | Moretti et al. | 324/207.25 |

FOREIGN PATENT DOCUMENTS 4-41332  9/1992  Japan .

Primary Examiner—Hezron E. Williams
Assistant Examiner—Helen C. Kwok
Attorney, Agent, or Firm—Evenson, McKeown, Edwards & Lenahan P.L.L.C.

[57] ABSTRACT

A rotational speed detection unit has a rotating tone wheel, a pole piece and a stationary sensor comprising a magnetic wire of the Wiegand wire or amorphous magnetostriction wire and a coil such that the tone wheel has an outer periphery with the alternative N and S poles with a uniform pitch, that one end of the sensor is connected to one end of the pole piece, and that as the tone wheel rotates, the other end of the sensor and the other end of the pole piece are magnetically connected to the N and S poles of the tone wheel, respectively, and vice versa.

13 Claims, 7 Drawing Sheets

ROTATIONAL SPEED DETECTION UNIT

BACKGROUND OF THE INVENTION

1. Field of the Invention

This invention is related to a rotational speed detection unit, specifically for use in detecting a rotational speed, for example, the rotational speed of the vehicle wheels, or of the main spindle of the machine tools.

2. Description of the Related Art

Rotational speed detection units involving a variety of mechanisms have heretofore been used to detect the rotational speed of a vehicle wheel to control an anti-lock braking system (ABS) or a traction control system (TCS), or to detect the rotational speed of a shaft such as the main spindle of a machine tool.

In general, rotational speed detection units for controlling an ABS or a TCS, are provided with a sensor wherein an emf induced in a coil changes in accordance with changes in magnetic flux density with rotation of the wheel. With such a unit however, the output of the sensor at low rotational speeds is small, and hence there is an unavoidable increase in cost on the controller side for accurate rotational speed detection to be achieved even at low outputs. Moreover, rotational speed detection at extremely low rotational speeds close to zero rpm is theoretically impossible.

As rotational speed detection units which give an output at a constant magnitude regardless of rotational speed, thus enabling rotational speed detection at extremely low speeds, there are the well known rotational speed detection units incorporating a Wiegand wire sensor or an amorphous magnetostriction wire sensor. A rotational speed detection unit incorporating a Wiegand wire sensor is disclosed for example in the American scientific magazine, "Electronics", Jul. 10, 1975, pp. 100–105, or in U.S. Pat. No. 3,820,090. Moreover, a rotational speed detection unit incorporating an amorphous magnetostriction wire sensor is disclosed for example in the Journal of the Japan Society of Applied Magnetism, Vol. 8, No. 2 (1984).

The Wiegand wire is a wire formed from a magnetic material, with the interior and the outer peripheral portion of the wire being different in coercivity or coercive force, while the amorphous magnetostriction wire is a wire wherein a residual stress is formed in the surface layer by rapid cooling of a molten metal.

Both the Wiegand wire and amorphous magnetostriction wire have the property that if placed in an external magnetic field parallel with the axis of the wires, then when the direction of the external magnetic field is changed, the direction of the internal magnetic flux reverses abruptly (instantaneously).

To detect this change in direction of flow of the magnetic flux, a coil is arranged around the Wiegand wire in the Wiegand wire sensor, while a coil is arranged around the amorphous magnetostriction wire in the amorphous magnetostriction wire sensor.

Figure 11:
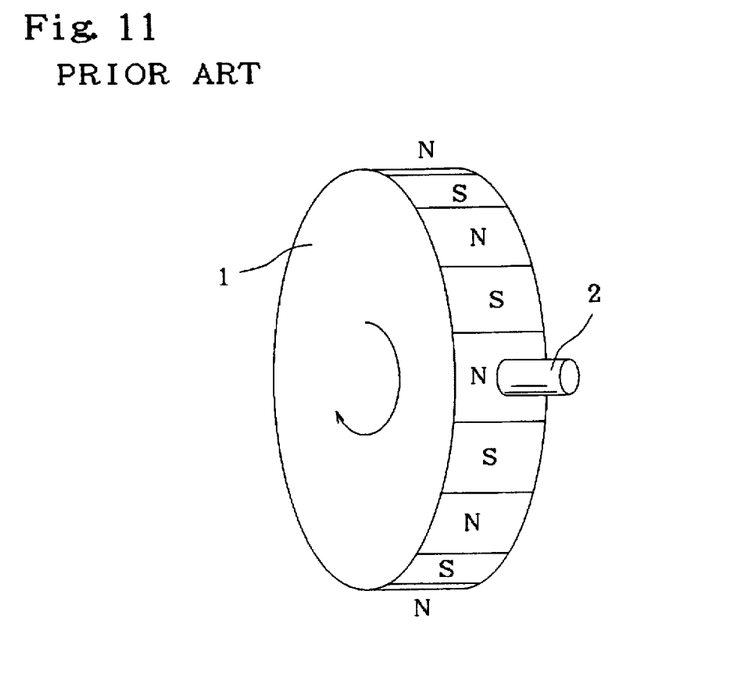
FIG. 11 is a schematic perspective view showing a first example of a conventional construction.
Figure 12:
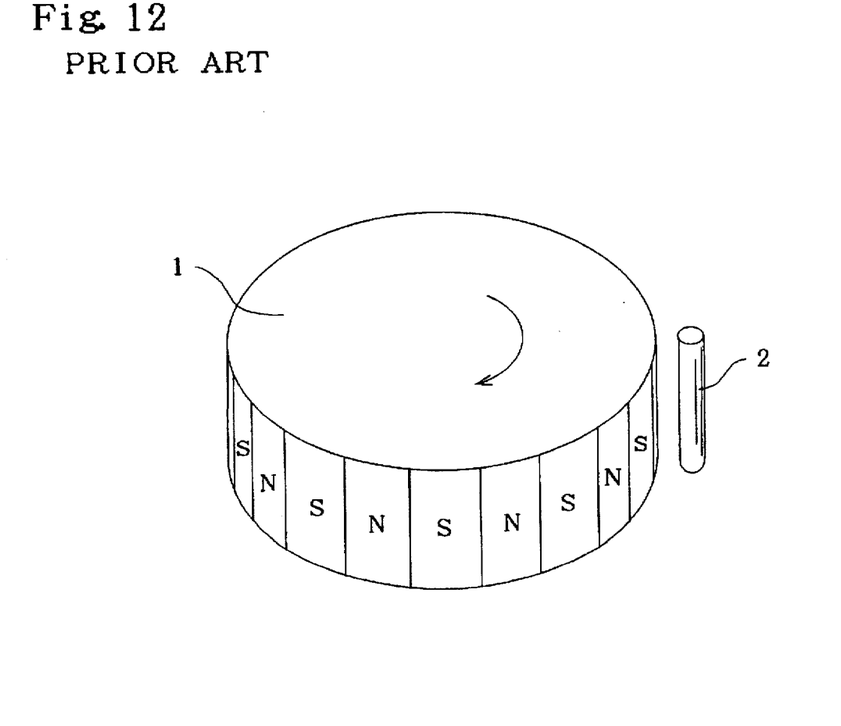
FIG. 12 is a schematic perspective view showing a second example of a conventional construction.

FIGS. 11 and 12 show two examples of well known constructions for rotational speed detection units which use such a Wiegand wire or amorphous magnetostriction wire sensor. Both of these rotational speed detection units incorporate a tone wheel 1 mounted on a rotation part, and a sensor 2 mounted on a non-rotation part.

The tone wheel 1 is made from a multipolar magnet, with South and North poles alternately disposed at even spacing.

Figure 13A:
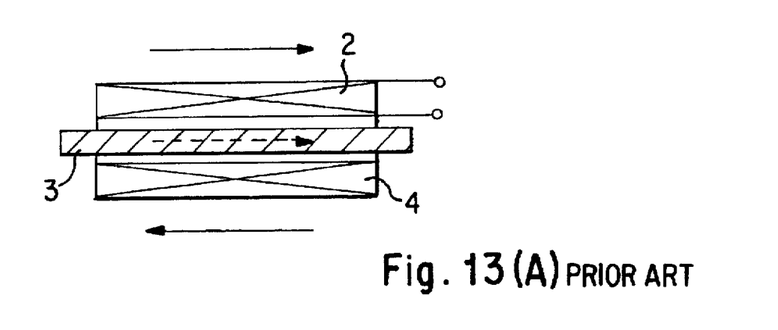
FIG. 13(A) and FIG. 13(B) are a cross-sectional view of a sensor portion for explaining a theory of producing an output.
Figure 13B:
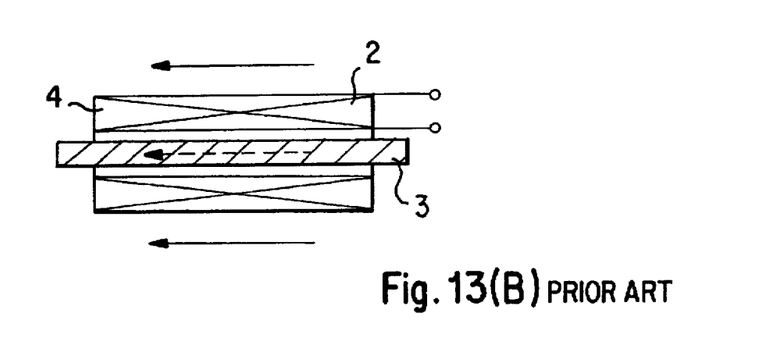

The sensor 2, as shown in FIG. 13(A) and FIG. 13(B) (to be discussed hereunder), comprises a magnetic wire 3 (Wiegand wire or amorphous magnetostriction wire) and a coil 4 surrounding the magnetic wire 3.

With the construction of the first example shown in FIG. 11, the sensor 2 is radially disposed relative to the tone wheel 1, with one axial end thereof placed adjacent to an outer peripheral face of the tone wheel 1.

With the construction of the second example shown in FIG. 12, the sensor 2 is disposed parallel with the rotation axis of the tone wheel 1, with the whole of the sensor 2 placed adjacent to the outer peripheral face of the tone wheel 1.

When using a rotational speed detection unit with the tone wheel 1 and the sensor 2 arranged in this manner, the direction of the magnetic field in which the sensor 2 is placed changes alternately with rotation of the tone wheel 1.

For example with the arrangement of FIG. 11, when the sensor 2 is opposed to a North pole on the outer peripheral face of the tone wheel 1, a magnetic field is generated around the sensor 2 in the direction of the full line arrow of FIG. 13(A), and a magnetic flux flows in the magnetic wire 3 in the same direction indicated by the broken line arrow.

On the other hand, when the sensor 2 is opposed to a South pole on the outer peripheral face of the tone wheel 1, a magnetic field is generated around the sensor 2 in the direction of the full line arrow of FIG. 13(B), and a magnetic flux flows in the magnetic wire 3 in the same direction indicated by the broken line arrow.

Figure 14:
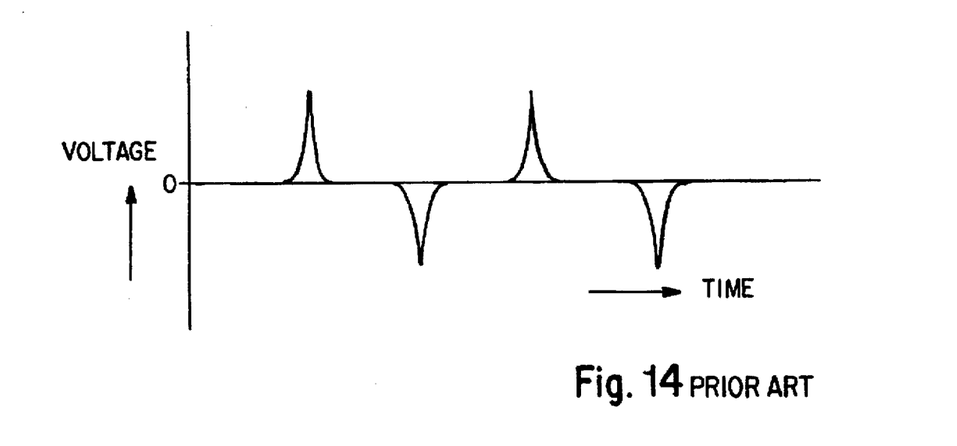
FIG. 14 is a graph showing an output wave form of a sensor.

Since this change (reversal) in flow direction of the magnetic flux in the magnetic wire 3 occurs instantaneously, a pulse-like signal voltage, as shown in FIG. 14, is induced in a coil 4 of the sensor 2. Hence, if this signal voltage is output to a controller, the rotational speed of the rotating part on which the tone wheel 1 is mounted can be determined. Moreover, since the abovementioned reversal is effected instantaneously irrespective of the rotational speed of the tone wheel 1, then a signal voltage of a constant magnitude is generated in the coil 4. Accordingly, the requirement for a circuit on the controller side to cope with the change in magnitude of the signal voltage is obviated, enabling a lower cost controller.

With the conventional rotational speed detection unit constructed and operated as described above, however, a stable output signal often cannot be obtained because an adequate magnetic field is not applied to the magnetic wire 3 of the sensor 2.

With the construction of the first example shown in FIG. 11, the magnetic field in the region of the one axial end of the sensor 2 is comparatively large, while the magnetic field in the region of the other axial end of the sensor 2 is small. This is because the magnetic field at the outer periphery of the tone wheel 1 drops rapidly with distance from the outer peripheral face of the tone wheel 1. Therefore with the construction as shown in FIG. 11 wherein sensor 2 is radially disposed relative to the tone wheel 1, as the gap between the tone wheel 1 and the one axial end of the sensor 2 is increased, the magnetic field at the other axial end of the sensor 2 remote from the tone wheel 1 is reduced, so that an even magnetic field is not applied to the whole of the sensor 2. As a result, the switching (reversal) of the direction of the magnetic flux in the magnetic wire 3 becomes unstable, resulting in an unstable output signal.

Moreover, with the second example shown in FIG. 12, since the North pole and the South pole are simply arranged alternately on the outer peripheral face of the tone wheel 1, then the component of the magnetic field in the axial direction of the sensor 2, due to the tone wheel 1, is small.

Therefore, if the gap between the tone wheel 1 and the sensor 2 is increased, the switching of the direction of the magnetic flux in the magnetic wire 3 of the sensor 2 becomes unstable, again resulting in an unstable output signal.

SUMMARY OF THE INVENTION

The rotational speed detection unit of the present invention has been developed in view of the above situation.

An object of the present invention is to provide a sensor wherein the component of the magnetic field applied to the magnetic wire (the Wiegand wire or the amorphous magnetostriction wire) of the sensor in the axial direction of the sensor, is increased to thereby stabilize the output of the sensor.

A rotational speed detection unit according to a first aspect of the present invention, incorporates a rotatable tone wheel and a stationary sensor such as to satisfy the following conditions 1 through 5:

1. The tone wheel comprises a multipolar magnet with its South and North poles alternately disposed circumferentially therearound.

2. The sensor is a Wiegand wire sensor or an amorphous magnetostriction wire sensor.

3. One end of the sensor is arranged magnetically connected to the tone wheel.

4. One end of a ferromagnetic pole piece is arranged magnetically connected to the other end of the sensor, and the other end of the pole piece is arranged magnetically connected to the tone wheel either directly or by way of another tone wheel.

5. As the tone wheel rotates, the S-magnetic pole of the tone wheel comes adjacent to the one end of the sensor when the N-magnetic pole of the tone wheel comes adjacent to the other end of the pole piece, and vice versa, that is, in the mutually opposite polarity relationship at that instant.

A rotational speed detection unit according to a second aspect of the present invention, incorporates a rotatable tone wheel and a stationary sensor such as to satisfy the following conditions 6 and 7:

6. The tone wheel comprises a multipolar magnet with a plurality of magnetized portions alternately disposed circumferentially therearound with the polarity of circumferentially adjacent portions being opposite to each other.

7. The sensor is a Wiegand wire sensor or an amorphous magnetostriction wire sensor, arranged adjacent to the cylindrical surface of the tone wheel with the axis thereof parallel to that of the tone wheel, and opposite ends thereof arranged adjacent to magnetic poles of mutually opposite polarity.

DESCRIPTION OF THE PREFERRED EMBODIMENTS

Figure 1:
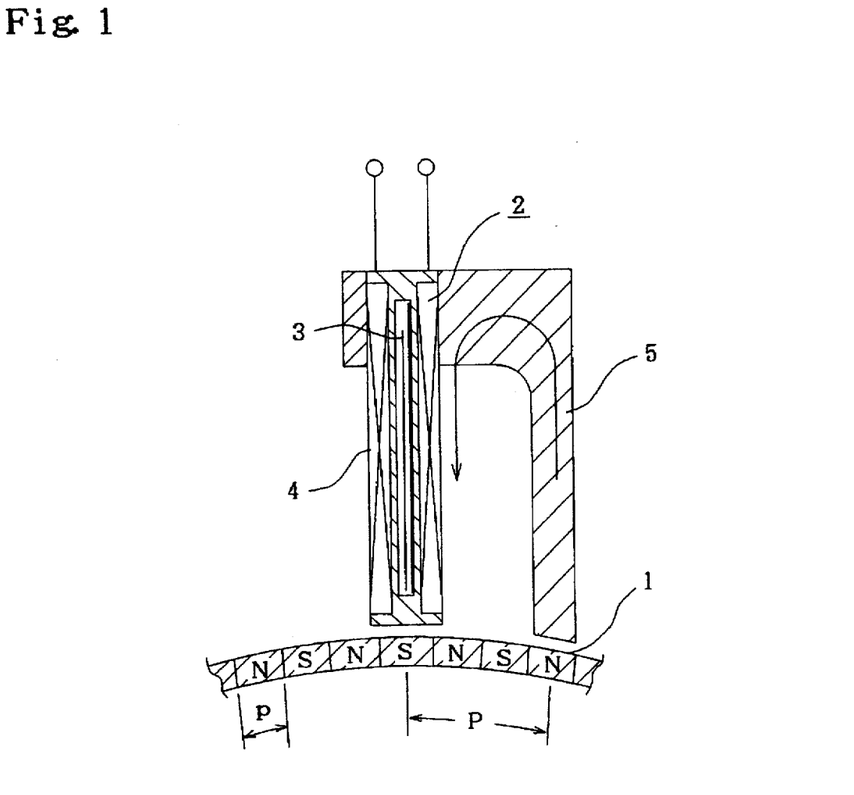
FIG. 1 is a schematic cross-sectional view showing a first embodiment according to the present invention.

A rotational speed detection unit according to a first aspect of the present invention as shown in FIG. 1, incorporates a tone wheel 1 mounted on a rotation part and a sensor 2 mounted on a non-rotation part, such as to satisfy the following conditions:

The tone wheel comprises a multipolar magnet with its South and North poles alternately disposed circumferentially therearound.

The sensor is a Wiegand wire sensor or an amorphous magnetostriction wire sensor, and combined with a ferromagnetic pole piece.

One end of the sensor is magnetically connected to the tone wheel, and the other end of the sensor is magnetically connected to one end of the pole piece.

The other end of the pole piece is arranged magnetically connected to the tone wheel either directly or by way of another tone wheel.

As the tone wheel rotates, the South pole of the tone wheel comes adjacent to the one end of the sensor when the North pole of the tone wheel comes adjacent to the other end of the pole piece, and vice versa, that is, in the mutually opposite polarity relationship at that instant.

Figure 3:
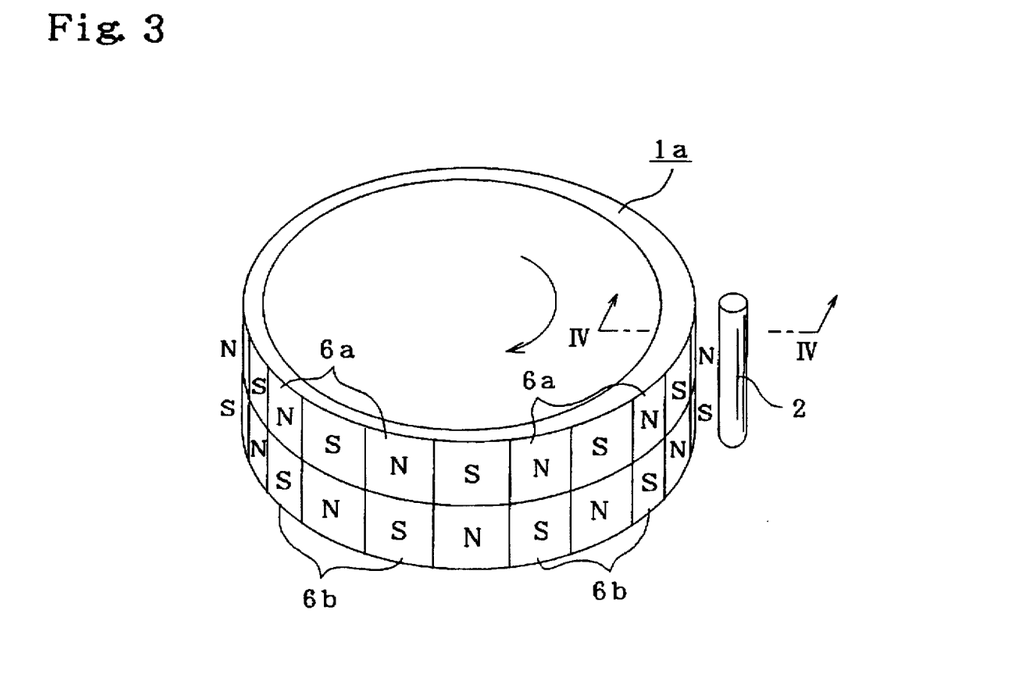
FIG. 3 is a schematic perspective view showing a third embodiment according to the present invention.

A rotational speed detection unit according to a second aspect of the present invention as shown in FIG. 3, incorporates a tone wheel 1a mounted on the rotation part and a sensor 2 mounted on the non-rotation part, such as to satisfy the following conditions.

The tone wheel comprises a multipolar magnet with a plurality of magnetized portions alternately disposed axially and circumferentially with the polarity of adjacent portions being opposite to each other.

The sensor is a Wiegand wire sensor or an amorphous magnetostriction wire sensor, arranged adjacent to the cylindrical surface of the tone wheel with the axis thereof parallel to that of the tone wheel, and opposite ends thereof arranged adjacent to magnetic poles of mutually opposite polarity.

With the rotational speed detection unit according to the present invention constructed as described above, the operation of detecting the instantaneous reversal of the magnetic flux flowing in the Wiegand wire or the amorphous magnetostriction wire, to thereby detect the rotational speed of the tone wheel, is substantially the same as for the beforementioned well known rotational speed detection unit.

However, with the rotational speed detection unit of the present invention, since the magnetic field applied to the Wiegand wire or the amorphous magnetostriction wire of the sensor is strengthened in the manner described hereunder, a stabilized sensor output can be obtained even with changes in the gap between the tone wheel and the sensor.

With the rotational speed detection unit according to the first aspect, the function of the pole piece enables opposite ends of the sensor to be arranged magnetically connected to the mutually opposite polarity poles of the permanent magnets of the tone wheel. As a result, the magnetic field applied to the Wiegand wire or the amorphous magnetostriction wire of the sensor can be increased.

With the rotational speed detection unit according to the second aspect, by optimally arranging the magnetized pattern of the multipolar magnet of the tone wheel, the applied magnetic field component parallel to the Wiegand wire or the amorphous magnetostriction wire of the sensor can be increased.

FIG. 1 shows a first embodiment according to the present invention corresponding to the first aspect.

A tone wheel 1 is concentrically mounted on a rotation part such as a hub for securing a wheel of a vehicle, or a main spindle of a machine tool, so as to rotate together with the rotation part. Moreover, a sensor 2 is mounted on a non-rotation part such as a fixed ring of a rolling bearing unit used to support the hub, or a housing accommodating the main spindle, so as not to rotate during use.

The tone wheel 1 comprises a permanent magnet with North and South poles alternately disposed at even spacing circumferentially therearound.

The sensor 2 is a Wiegand wire or an amorphous magnetostriction wire sensor. More specifically, the sensor 2 is constructed with a magnetic wire 3 and a coil 4 surrounding the magnetic wire 3 in an overall rod shape. The magnetic wire 3 is a Wiegand wire or an amorphous magnetostriction wire.

The sensor 2 is radially disposed relative to the tone wheel 1, with one axial end (bottom end in FIG. 1) placed adjacent to an outer peripheral face of the tone wheel 1.

The sensor 2 is combined with a pole piece 5 made in the form of a ferromagnetic material such as low carbon steel, such that one end of the pole piece 5 is connected to the other end of the sensor 2 (upper end in FIG. 1), while the other end of the pole piece 5 is arranged adjacent to the outer peripheral face of the tone wheel 1.

A pitch P between the one end of the sensor 2 and the other end of the pole piece 5 is made an odd number multiple of a pitch p between the adjacent magnetic poles on the outer peripheral face of the tone wheel 1 (with the embodiment in FIG. 1, P=3p).

Consequently, at the instant when the one end of the sensor 2 opposes the South pole, the other end of the pole piece 5 opposes the North pole, and vice versa. That is, the magnetic pole adjacent to the one end of the sensor 2 and the magnetic pole adjacent to the other end of the pole piece 5 are of mutually opposite polarity at that instant.

With the rotational speed detection unit according to the present invention constructed as described above, the operation of detecting the instantaneous reversal of the magnetic flux flowing in the magnetic wire 3 (Wiegand wire or amorphous magnetostriction wire) to thereby detect the rotational speed of the tone wheel, is practically the same as for the beforementioned well known rotational speed detection unit.

However, with the rotational speed detection unit of the present invention, since the magnetic field applied to the magnetic wire 3 (Wiegand wire or amorphous magnetostriction wire) of the sensor 2 is strengthened, the output of the sensor 2 can be stabilized. More specifically, at the instant when the one end of the sensor 2 is magnetically connected to the South pole, the other end of the sensor 2 is magnetically close to the North pole, by way of the pole piece 5. On the other hand, at the instant when the one end of the sensor 2 is magnetically connected to the North pole, the other end of the sensor 2 is magnetically connected to the South pole, by way of the pole piece 5. Hence, the magnetic field applied to the magnetic wire 3 at either of the instants, is increased. Moreover, between these instants in time, the direction of the magnetic flux flowing in the magnetic wire 3 is instantaneously switched. As a result, the output of the sensor 2 is stabilized, enabling rotational speed detection of the rotating member on which the tone wheel 1 is mounted to be simply and reliably carried out.

Accordingly, even if the magnetic field on the surface of the tone wheel 1 is weak, rotational speed detection can be reliably carried out. As a result, a stable output can be obtained, even if the gap between the surface of the tone wheel 1 and the sensor 2 changes. Moreover, an increase in the number of magnetic poles on the surface of the tone wheel 1, in spite of the fact that it may lead to a reduction in strength of the surface magnetic field, is possible. Hence rotational speed detection resolution can be improved by increasing in the number of magnetic poles.

Figure 2:
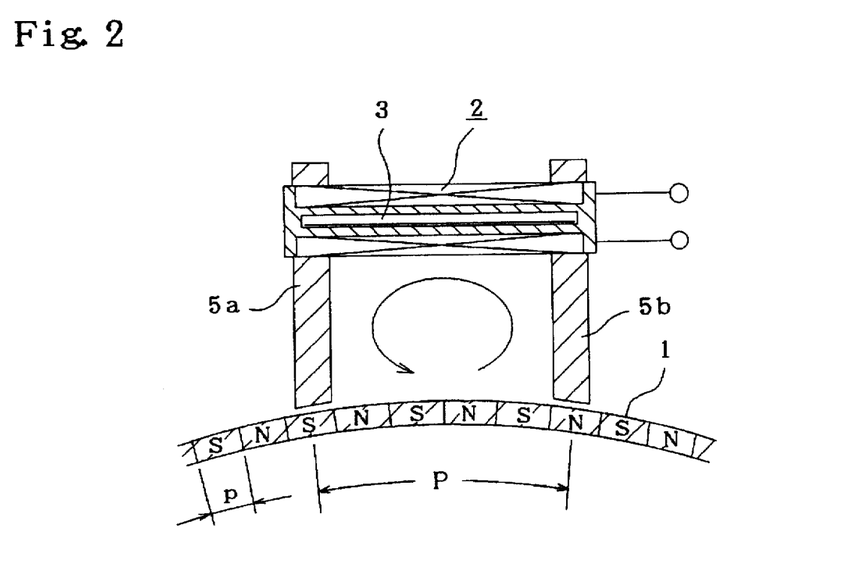
FIG. 2 is a schematic cross-sectional view showing a second embodiment according to the present invention.

FIG. 2 shows a second embodiment according the present invention corresponding to the first aspect. With this embodiment, the sensor 2 is disposed at an angle to the rotation axis of the tone wheel 1 (shown as perpendicular thereto in FIG. 2), and a pair of straight pole pieces 5a, 5b are combined with the sensor 2. Opposite ends of the sensor 2 are connected to respective ends (upper ends in FIG. 2) of the pole pieces 5a, 5b. The other ends of the pole pieces 5a, 5b are arranged adjacent to the outer peripheral face of the tone wheel 1.

With this embodiment, a pitch P between the other ends of the pole pieces 5a, 5b is made an odd number multiple of a pitch p between the adjacent magnetic poles on the outer peripheral face of the tone wheel 1 (with the embodiment in FIG. 2, P=5p).

Consequently, the magnetic pole adjacent to the other end of the pole piece 5a, and the magnetic pole adjacent to the end of the pole piece 5b are of mutually opposite polarity at any instant. As a result, the one end of the sensor 2 is arranged magnetically connected to the North pole (or the South pole) while the other end is magnetically connected to the South pole (or the North pole), by way of the pole pieces 5a, 5b respectively.

Also with this embodiment, constructed in the above manner, the magnetic field applied to the magnetic wire 3 of the sensor 2 is increased. Hence the output of the sensor 2 is stabilized and a similar operational effect to the above-mentioned first embodiment, such as being able to simply and reliably carry out rotational speed detection of the rotating member on which the tone wheel 1 is mounted, is obtained.

Figure 4:
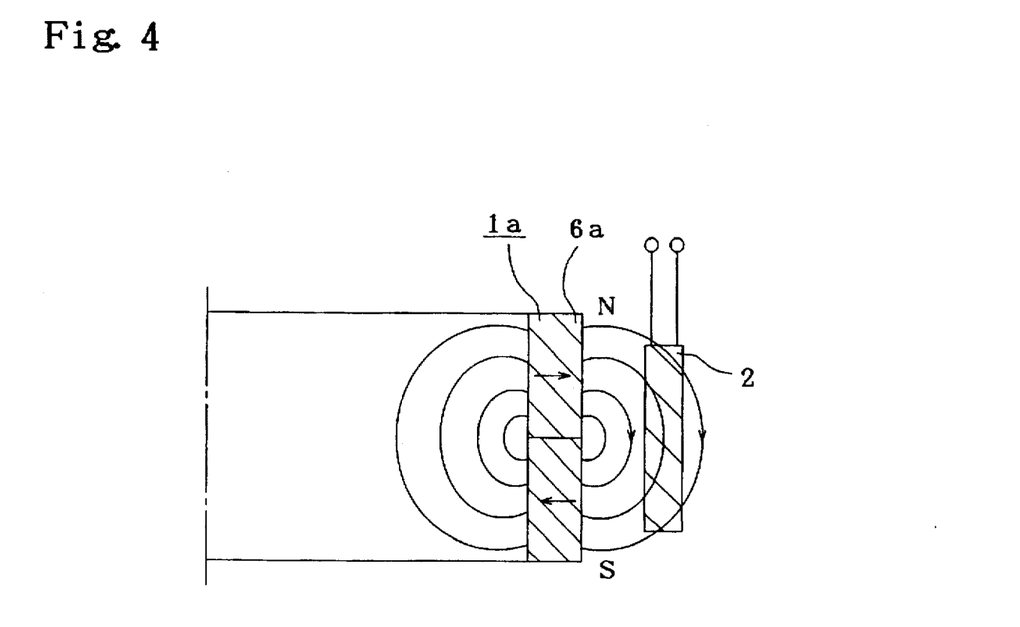
FIG. 4 is a sectional view taken along the line IV—IV of FIG. 3, for explaining magnetic flux flow.

FIGS. 3 and 4 show a third embodiment according the present invention corresponding to a second aspect. A tone wheel 1a mounted on a rotation part, comprises a multipolar magnet with a plurality of magnetized portions 6a, 6b in double rows. The magnetized portions 6a, 6b in each row are alternately disposed circumferentially therearound, and the pole pattern of the magnetized portions 6a, 6b is opposite in the rows at the same circumferential position. The rotational speed detection unit in which the tone wheel 1a is assembled, has a sensor 2 the construction of which is substantially the same as for the beforementioned first and second embodiments.

With this embodiment however, the sensor 2 is arranged parallel to the rotation axis of the tone wheel 1a, and adjacent to the outer peripheral surface thereof. Accordingly, as shown in FIG. 4, the sensor 2 is disposed in and substantially parallel to the magnetic field formed by the respective magnetized portions 6a, 6b.

With the rotational speed detection unit of the present embodiment constructed as described above, the component of the magnetic field in the axial direction of the sensor 2, applied to the Wiegand wire or the amorphous magnetostriction wire (the magnetic wire 3 of the sensor 2), is increased. As a result, even if the gap between the tone wheel 1a and the sensor 2 changes, the output of the sensor 2 is stabilized, enabling rotational speed detection of the rotating member on which the tone wheel 1a is mounted to be simply and reliably carried out. However, with the construction of the embodiment corresponding to the second aspect, compared to the construction of the embodiment corresponding to the first aspect, the sensor 2 can be located closer to the outer peripheral face of the tone wheel 1a. Consequently, the outer diameter of the whole rotational speed detection unit can be reduced. Other operational effects are the same as for the beforementioned first embodiment.

Figure 5:
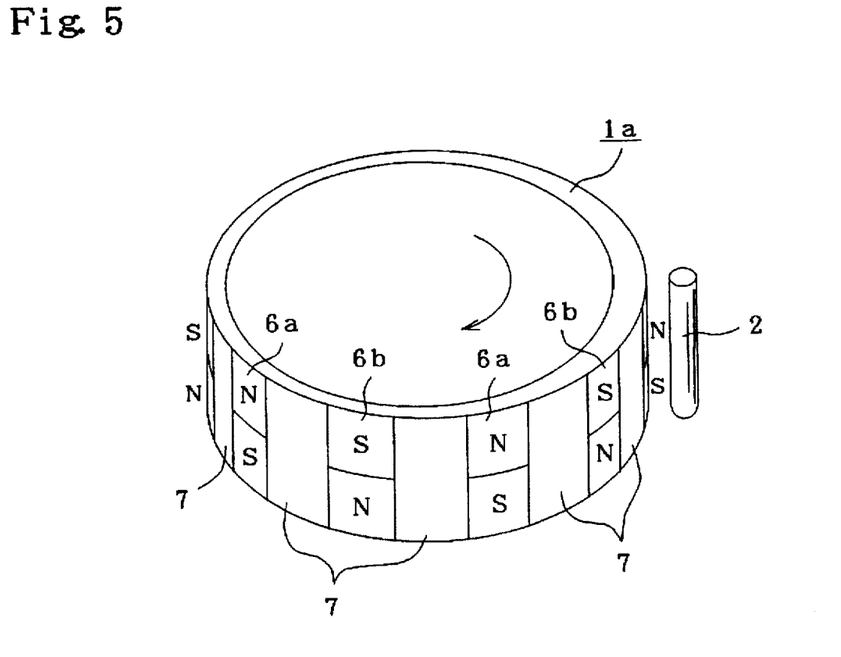
FIG. 5 is a schematic perspective view showing a fourth embodiment according to the present invention.

FIG. 5 shows a fourth embodiment according to the present invention corresponding to the second aspect. With this embodiment, non magnetized portions 7 are provided between the magnetized portion 6a and magnetized portion 6b, to thereby prevent interference of the magnetic flux between the adjacent magnetized portion 6a, 6b, and thus maintain the strength of the magnetic field component in the axial direction of the sensor 2, around the respective magnetized portions. Other construction and operation are the same as for the abovementioned third embodiment.

Figure 6:
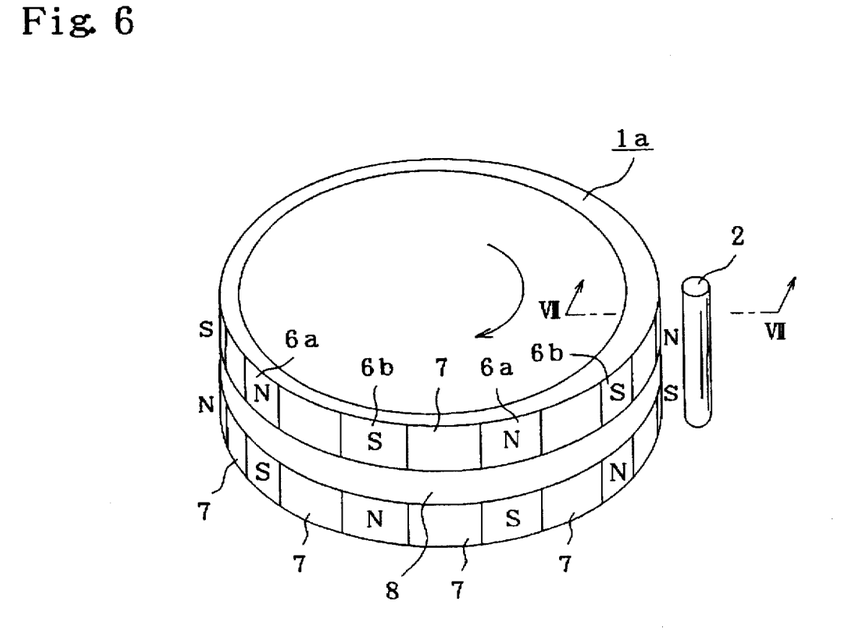
FIG. 6 is a schematic perspective view showing a fifth embodiment.
Figure 7:
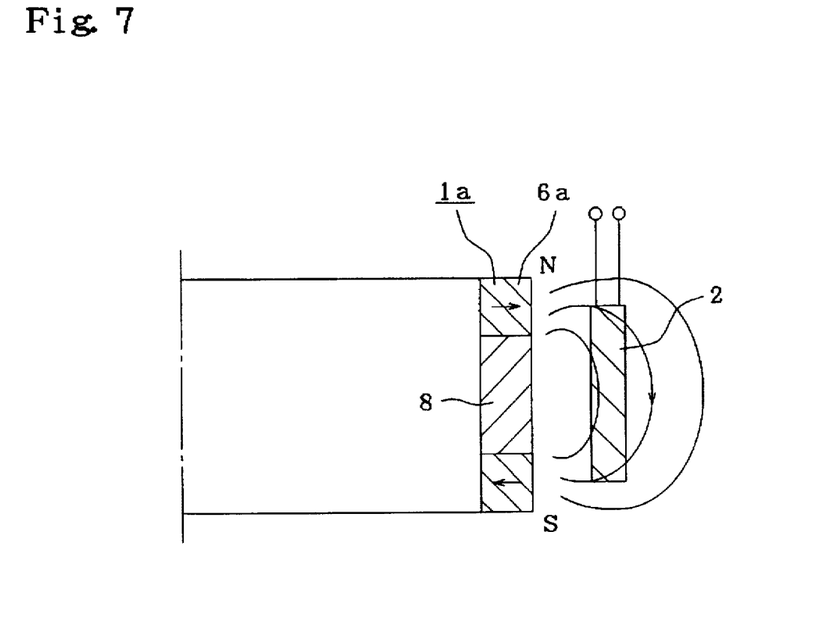
FIG. 7 is a sectional view taken along the line VII—VII of FIG. 6, for explaining magnetic flux flow.

FIGS. 6 and 7 show a fifth embodiment according to the present invention corresponding again to the second aspect. With this embodiment an annular non-magnetized portion 8 is placed between the two rows of the magnetized portions 6a, 6b. Specifically the South poles and the North poles of the respective in the rows at the same circumferential position are separated in the axial direction of the tone wheel 1a, with part of the non magnetized portion 8 provided therebetween. Provision of this non magnetized portion 8 results in an increase in the magnetic field component in the axial direction of the sensor 2, at the region where the sensor 2 is located. Other construction and operation are substantially the same as for the abovementioned third embodiment.

Figure 8:
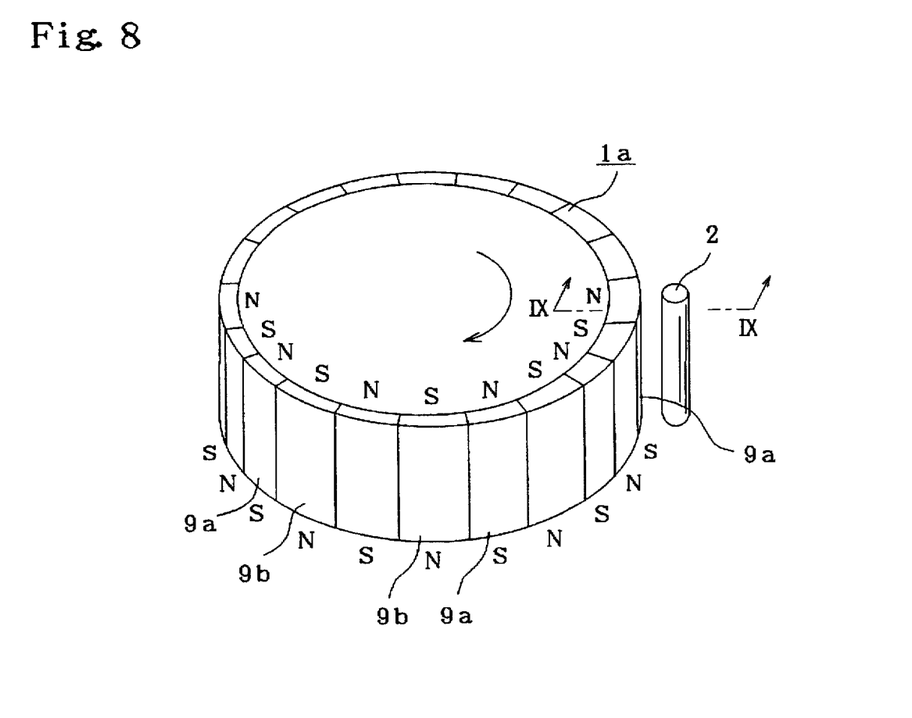
FIG. 8 is a schematic perspective view showing a sixth embodiment according to the present invention.
Figure 9:
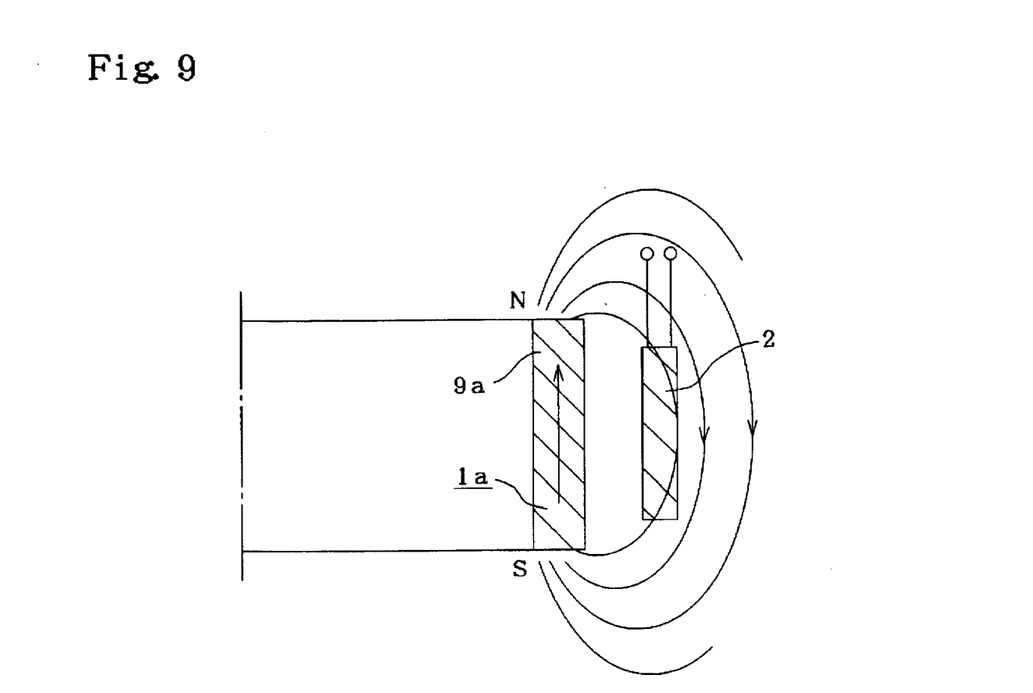
FIG. 9 is a sectional view taken along the line IX—IX of FIG. 8, for explaining magnetic flux flow.

FIGS. 8 and 9 show a sixth embodiment according to the present invention corresponding again to the second aspect. With this embodiment, the tone wheel 1a is formed in a cylindrical shape and made up of a multipolar magnet, magnetized in the axis direction of the tone wheel 1a. Magnetized portions 9a, 9b are arranged so that the circumferentially adjacent magnetized portions 9a, 9b are in mutually opposite in magnetic orientation. In this way, the magnetic field component in the axial direction of the sensor 2 is increased. Other construction and operation are substantially the same as for the third embodiment.

Figure 10:
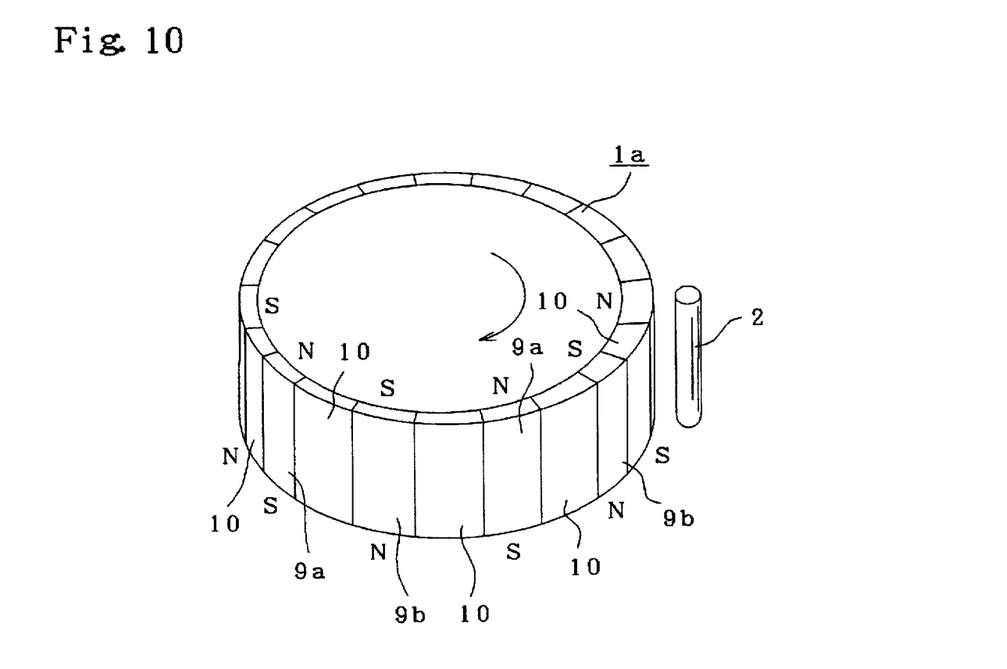
FIG. 10 is a schematic perspective view showing a seventh embodiment according to the present invention.

FIG. 10 shows a seventh embodiment according to the present invention corresponding again to the second aspect. With this embodiment, non magnetized portions 10 are provided between adjacent magnetized portions 9a, 9b. In this case, by providing the non magnetized portions 10 between the adjacent magnetized portions 9a, 9b, interference of the magnetic flux between adjacent magnetized portions 9a, 9b is prevented, so that the strength of the magnetic field component in the axial direction of the sensor 2, around the respective magnetized portions 9a, 9b can be maintained. Other construction and operation are the same as for the abovementioned sixth embodiment.

With the rotational speed detection unit of the present invention constructed as described above, the component of the magnetic field in the axial direction of the sensor, applied to the Wiegand wire or the amorphous magnetostriction wire of the sensor, is increased. As a result, even if the gap between the tone wheel and the sensor changes, the output of the sensor is stabilized, enabling highly reliable rotational speed detection. Moreover, high resolution rotational speed detection is also possible.

What is claimed is:

1. A rotational speed detection unit comprising a rotatable tone wheel having first and second magnetic poles with opposite polarities, a stationary sensor and a ferromagnetic pole piece combined with the sensor, satisfying the following conditions:

a. that the tone wheel comprises a multipolar magnet with said first and second magnetic poles alternately disposed circumferentially therearound, b. that the sensor is selected from a Wiegand wire sensor and an amorphous magnetostriction wire sensor, c. that the sensor has a first end arranged magnetically connected to the tone wheel and a second end, d. that the ferromagnetic pole piece has a first end arranged magnetically connected to the second end of the sensor, and a second end arranged magnetically connected to the tone wheel, and e. that as the tone wheel rotates the first and second magnetic poles of the tone wheel pass adjacent to the first end of the sensor and the second end of the pole piece in a mutually opposite polarity relationship.

2. A rotational speed detection unit comprising a rotatable tone wheel having first and second magnetized portions with opposite polarities and a cylindrical surface and an elongated stationary sensor with opposite ends satisfying the following conditions:

a. that the tone wheel is rotatable around an axis and comprises a multipolar magnet with a plurality of said magnetized portions alternately disposed circumferentially therearound with the polarity of circumferentially adjacent ones of said magnetized portions being mutually opposite, b. that the sensor is selected from a Wiegand wire sensor and an amorphous magnetostriction wire sensor, arranged adjacent to the cylindrical surface of the tone wheel to extend parallel to the surface of the tone wheel, and has the opposite ends arranged adjacent to the magnetized portions of mutually opposite polarity.

3. A rotational speed detection unit comprising a rotatable tone wheel having first and second magnetic poles with opposite polarities, a stationary sensor and a ferromagnetic pole piece having first and second ends and combined with the sensor satisfying the following conditions:

a. that the tone wheel comprises a multipolar magnet with said first and second magnetic poles alternately disposed circumferentially therearound, b. that the sensor is selected from a Wiegand wire sensor and an amorphous magnetostriction wire sensor, c. that the sensor has a first end arranged magnetically connected to the tone wheel, and a second end magnetically connected to the first end of the pole piece, d. that the second end of the pole piece is magnetically connected to the tone wheel, e. that as the tone wheel rotates, one of the first magnetic poles of the tone wheel is adjacent to the first end of the sensor when one of the second magnetic poles of the tone wheel is adjacent to the second end of the pole piece, and one of the second magnetic poles of the tone wheel is adjacent to the first end of the sensor when one of the first magnetic poles of the tone wheel is adjacent to the second end of the pole piece.

4. A rotational speed detection unit comprising a rotatable tone wheel having first and second magnetized portions with opposite polarities and a cylindrical surface and an elongated stationary sensor with opposite ends satisfying the following conditions:

a. that the tone wheel is rotatable around an axis and comprises a multipolar magnet with a plurality of said magnetized portions alternately disposed circumferentially therearound with the polarity of circumferentially adjacent ones of said magnetized portions being mutually opposite, and a non-magnetic portion interposed between the circumferentially adjacent magnetized portions, b. that the sensor is selected from a Wiegand wire sensor and an amorphous magnetostriction wire sensor, arranged adjacent to the cylindrical surface of the tone wheel to extend parallel to the surface of the tone wheel, and has the opposite ends arranged adjacent to the magnetized portions of mutually opposite polarity.

5. A rotational speed detection unit comprising a rotatable tone wheel having first and second magnetized portions having opposite polarities and a cylindrical surface and an elongated stationary sensor with opposite ends satisfying the following conditions:

a. that the tone wheel is rotatable around an axis and comprises a multipolar magnet with a plurality of said magnetized portions alternately disposed circumferentially therearound with the polarity of circumferentially adjacent ones of said magnetized portions being mutually opposite, and a non-magnetic portion interposed between axially adjacent ones of said magnetized portions, b. that the sensor is selected from a Wiegand wire sensor and an amorphous magnetostriction wire sensor, arranged adjacent to the cylindrical surface of the tone wheel to extend parallel to the surface of the tone wheel, and has the opposite ends arranged adjacent to the magnetized portions of mutually opposite polarity.

6. A rotational speed detection unit according to claim 1, wherein said first and second magnetic poles are alternately disposed circumferentially around the tone wheel at a tone wheel pitch, and wherein a pitch between the first end of the sensor and the second end of the pole piece is an odd number multiple of said tone wheel pitch.

7. A rotational speed detection unit according to claim 3, wherein said first and second magnetic poles are alternately disposed circumferentially around the tone wheel at a tone wheel pitch, and wherein a pitch between the first end of the sensor and the second end of the pole piece is an odd number multiple of said tone wheel pitch.

8. A rotational speed detection unit according to claim 2, wherein said sensor is arranged parallel to said axis of the tone wheel.

9. A rotational speed detection unit according to claim 4, wherein said sensor is arranged parallel to said axis of the tone wheel.

10. A rotational speed detection unit according to claim 5, wherein said sensor is arranged parallel to said axis of the tone wheel.

11. A rotational speed detection unit according to claim 2, wherein said magnetized portions are arranged in two axially adjacent rows with the polarity of axially adjacent ones of said magnetized portions being mutually opposite.

12. A rotational speed detection unit according to claim 4, wherein said magnetized portions are arranged in two axially adjacent rows with the polarity of axially adjacent ones of said magnetized portions being mutually opposite.

13. A rotational speed detection unit according to claim 5, wherein said magnetized portions are arranged in two axially adjacent rows with the polarity of axially adjacent ones of said magnetized portions being mutually opposite.

* * * * *